(12) United States Patent
Okada

(10) Patent No.: US 6,579,449 B2
(45) Date of Patent: Jun. 17, 2003

(54) CARBONATED WATER SUPPLY SYSTEM

(75) Inventor: Yumi Okada, Obu (JP)

(73) Assignee: Hoshizaki Denki Kabushiki Kaisha, Toyoake (JP)

( * ) Notice: Subject to any disclaimer, the term of this patent is extended or adjusted under 35 U.S.C. 154(b) by 1 day.

(21) Appl. No.: 09/820,732

(22) Filed: Mar. 30, 2001

(65) Prior Publication Data

US 2001/0045381 A1 Nov. 29, 2001

(51) Int. Cl.[7] ................................................. B67D 1/04
(52) U.S. Cl. .......................... 210/137; 426/477; 261/5; 222/189.06; 210/205
(58) Field of Search .............................. 137/12.5, 170.1, 137/170.2; 426/474, 477; 261/DIG. 7, 5; 222/129, 189.06; 99/323.2; 210/137, 205, 134, 206

(56) References Cited

U.S. PATENT DOCUMENTS

| | | | |
|---|---|---|---|
| 3,943,261 A | * | 3/1976 | Amon et al. |
| 4,660,741 A | * | 4/1987 | Kirschner et al. |
| 4,761,295 A | * | 8/1988 | Casey |
| 5,118,010 A | * | 6/1992 | Jeans |

* cited by examiner

Primary Examiner—Joseph Drodge
Assistant Examiner—Terry K. Cecil
(74) Attorney, Agent, or Firm—Oliff & Berridge, PLC

(57) ABSTRACT

In the carbonated water supply system 1, water supplied from the water supply 2 through the water supply conduit 3 is supplied to the carbonator 5 through the water supply valve 4 and high pressure strong carbonated water is produced in the carbonator 5 and supplied to the water purifier 7 through the conduit 8A. Further, high pressure strong carbonated water in the water purifier 7 is purified therein while retaining its high pressure and is supplied to the pressure releasing valve 9 through the conduit 8B, the water supply valve 10. High pressure strong carbonated water is discharged out of the system 1 through the pressure releasing valve 9 as low pressure carbonated water the pressure of which is as same as the atmospheric pressure.

3 Claims, 2 Drawing Sheets

CARBONATED WATER SUPPLY SYSTEM

BACKGROUND OF THE INVENTION

1. Field of the Invention

The present invention relates to a carbonated water supply system, and in particular, to a carbonated water supply system in which carbonated water with a high pressure produced in a carbonator is supplied to and is purified in a water purifier while retaining a high pressure of carbonated water, thereafter carbonated water is discharged out of the system through a pressure releasing valve, thereby breeding of bacteria and the like in the water purifier can be suppressed and bacteria in carbonated water discharged out of the system through the pressure releasing valve can be disinfected.

2. Description of Related Art

Conventionally, in a carbonated water supplier such as a drinking water dispenser, carbonated water is produced by dissolving carbon dioxide gas in water supplied from a water supply under a high pressure condition by using a carbonator and such carbonated water is utilized for preparing various drinks.

However, recently, pollution of water supply is progressed due to urbanization according to a high growth of economy and amount of chlorine agent used for disinfection in a water purifying plant is increasing more and more due to drafty water flow often occurring in summer season. As a result, there occur problems that residual chlorine amount in water increases and water becomes poor taste. Further, people who want to drink safe water with good taste are increasing.

To solve above problems, there have been developed various systems for producing carbonated water in which water is charged into a water purifier having hollow yarn membranes or activated carbon, thereafter is charged into a carbonator.

Conventional carbonated water supply system will be described according to FIG. 2. FIG. 2 is a schematic block diagram indicating a conventional carbonated water supply system.

As shown in FIG. 2, the carbonated water supply system 15, to which water is supplied through a water supply 16 and a supply conduit 17, comprises a water purifier 18 having hollow yarn membranes or activated carbon, a carbonator 19 producing carbonated water by dissolving carbon dioxide gas in supplied water under a high pressure condition, a carbon dioxide gas bomb 20 supplying carbon dioxide gas with a high pressure to the carbonator 19, a water supply valve 21 arranged in a conduit connecting both the water purifier 18 and the carbonator 19 to adjust water quantity by opening or closing and a pressure releasing valve 22 arranged in a conduit to discharge carbonated water out of the system 15, the pressure releasing valve 22 adjusting a pressure of carbonated water to a lower pressure.

Based on the above construction of the carbonated water supply system 15, when water supplied from the water supply 16 to the supply conduit 17 passes through the hollow yarn membranes or activated carbon in the water purifier 18, chlorine components and bacteria included in water is adhered to membranes or carbon and removed. Thereafter, water purified by the water purifier 18 is charged into the carbonator 19 through the water supply valve 21. In the carbonator 19, carbonated water with a high pressure is produced and discharged out of the system 15 as carbonated water with a low pressure through the pressure releasing valve 22.

Thereby, according to the above system 15, carbonated water with good taste and without chlorine smell can be safely supplied since carbonated water is produced from water purified by the water purifier 18.

However, in a case that the water supply valve 21 is closed for a long time and supply of carbonated water is stopped, bacteria adhered to hollow yarn membranes or activated carbon in the water purifier 18 breed in membranes or carbon since a pressure in the water purifier 18 is 50 kPa as same as a pressure of the water supply 16. Therefore, when the water supply valve 21 is opened again, water indicating a live bacteria value far exceeding a water quality standard value will be charged into the carbonator 19. And if such water with a high live bacteria value passes through the carbonator 19 in a short time, survival rate of bacteria becomes high though number of bacteria slightly decreases. Thus, there is a problem that carbonated water not satisfying the water quality standard is discharged out of the system 1 through the pressure releasing valve 22.

In order to avoid the above problem, when the water supply valve 21 is opened again after the water supply valve 21 is closed for a long time and supply of carbonated water is stopped, it is necessary to cast away a certain quantity of carbonated water until the live bacteria value in carbonated water becomes lower than the water quality standard value. In this case, consumption of water remarkably increases and product cost of carbonated water inevitably increases.

SUMMARY OF THE INVENTION

The present invention is made to accomplish the above problems and has a purpose to provide a carbonated water supply system in which carbonated water is purified in a water purifier while retaining a pressure of carbonated water supplied from a carbonator to a high pressure, thereafter carbonated water is discharged out of the system through a pressure releasing valve, thereby breeding of bacteria and the like in the water purifier can be suppressed and bacteria in carbonated water discharged out of the system can be disinfected, as a result, carbonated water with good taste and without chlorine smell can be safely produced.

Further, the present invention has another purpose to provide a carbonated water supply system in which consumption of water can be reduced by eliminating waste of carbonated water when supply of carbonated water is restarted after stopped for a long time, thereby product cost of carbonated water can be efficiently reduced.

In order to accomplish the above purposes, according to one aspect of the present invention, it is provided a carbonated water supply system comprising:

a carbonator producing carbonated water having a predetermined pressure from water supplied through a first water supply conduit;

a water purifier to which carbonated water with the predetermined pressure is supplied from the carbonator, the water purifier purifying carbonated water while retaining the predetermined pressure; and a pressure releasing valve lowering a pressure of the carbonated water supplied from the water purifier while lowering the predetermined pressure to a pressure lower than the predetermined pressure.

In the carbonated water supply system, the carbonator produces the carbonated water having the predetermined pressure by using water supplied through the first water supply conduit and carbonated water is supplied to the water purifier. The carbonated water supplied to the water purifier is purified through hollow yarn membranes or activated carbon in the water purifier while retaining the predetermined pressure, thereafter carbonated water is discharged out of the system through the pressure releasing valve.

Therefore, carbonated water in the carbonator and the water purifier is retained in a state that highly concentrated carbon dioxide gas is dissolved therein while retaining the predetermined pressure, as a result, breeding of bacteria and the like in the carbonator and the water purifier can be efficiently suppressed and a live bacteria value can be retained a value lower than a water quality standard. Further, in this case, if there will exist bacteria and the like which can breed under such a high pressure condition, when carbonated water is discharged out of the system through the pressure releasing valve, carbon dioxide gas dissolved in cells of bacteria and the like rapidly expands, thus cells are exploded. As a result, bacteria and the like becomes extinct and carbonated water is disinfected. Therefore, the live bacteria value of carbonated water always becomes lower than the water quality standard, thus carbonated water with good taste and without chlorine smell can be safely produced.

According to another aspect of the present invention, the carbonated water supply system further comprises a second water supply conduit connecting the water purifier and the pressure releasing valve; and a first water supply valve arranged in the second water supply conduit, the first water supply valve controlling supply quantity of carbonated water to the pressure releasing valve.

In the above system, if supply of carbonated water is stopped for a long time by closing the first water supply valve, a pressure of carbonated water in the water purifier is substantially retained to a pressure of carbonated water in the carbonator. Therefore, breeding of bacteria and the like adhered to hollow yarn membranes or activated carbon in the water purifier can be efficiently suppressed. Thus, when the first water supply valve is opened again, the live bacteria value of carbonated water discharged from the water purifier though the pressure releasing valve certainly becomes lower than the water quality standard. As a result, it is unnecessary to cast away rather quantity of carbonated water and product cost of carbonated water can be efficiently reduced by decreasing consumption of water.

According to further another aspect of the present invention, the carbonated water supply system further comprises a third water supply conduit through which water is supplied to the carbonator; and a second water supply valve arranged in the third water supply conduit, the second water supply valve controlling supply quantity of water to the carbonator.

In the above system, if the first water supply valve and the second water supply valve are simultaneously closed, a pressure of carbonated water in the carbonator and the water purifier can be retained to the predetermined pressure.

According to further another aspect of the present invention, the predetermined pressure of carbonated water lies in a range of 200,000 Pa to 400,000 Pa. Since carbonated water in the carbonator and the water purifier is retained under such a high pressure condition, carbonated water in the carbonator and the water purifier is retained in a state that highly concentrated carbon dioxide gas is dissolved therein, as a result, breeding of bacteria and the like in the carbonator and the water purifier can be efficiently suppressed and the live bacteria value can be retained at a value lower than the water quality standard. Further, in this case, if there exist bacteria and the like which can breed under such high pressure conditions, when carbonated water is discharged out of the system through the pressure releasing valve, carbon dioxide gas dissolved in cells of bacteria and the like rapidly expands, thus cells are exploded. As a result, bacteria and the like becomes extinct and carbonated water is disinfected. Therefore, carbonated water satisfying the water quality standard can be obtained.

According to further another aspect of the present invention, in the carbonated water supply system, the pressure releasing valve lowers the pressure of carbonated water approximately to the atmospheric pressure. Thus, if there will exist bacteria and the like which can breed under a high pressure condition, when carbonated water is discharged out of the system through the pressure releasing valve, a pressure of the carbonated water is lowered to the atmospheric pressure, therefore carbon dioxide gas dissolved in cells of bacteria and the like rapidly expands and cells are exploded. As a result, bacteria and the like becomes extinct and carbonated water is disinfected. Therefore, carbonated water satisfying the water quality standard can be obtained.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention.

In the drawings.

DETAILED DESCRIPTION OF THE PREFERRED EMBODIMENTS

Figure 1:
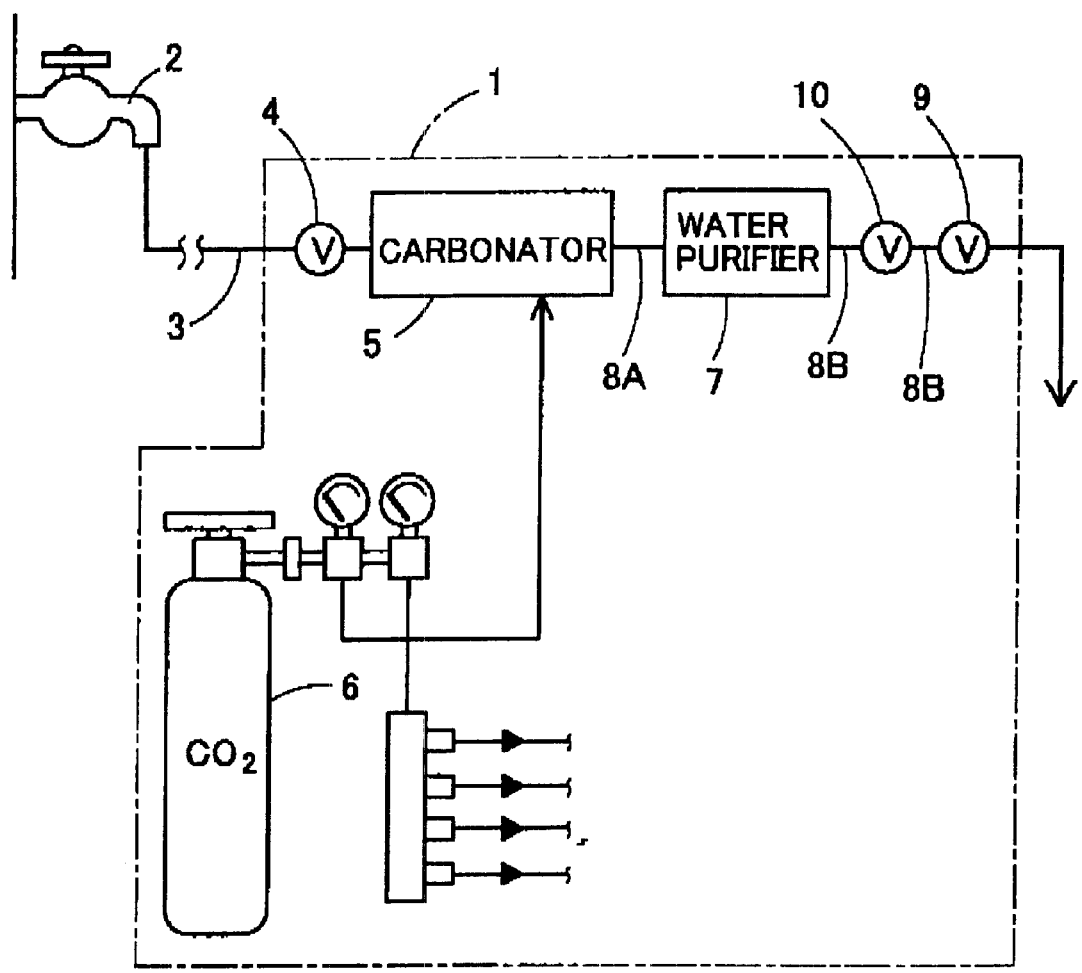
FIG. 1 is a block diagram schematically indicating a carbonated water supply system according to the embodiment.
Figure 2:
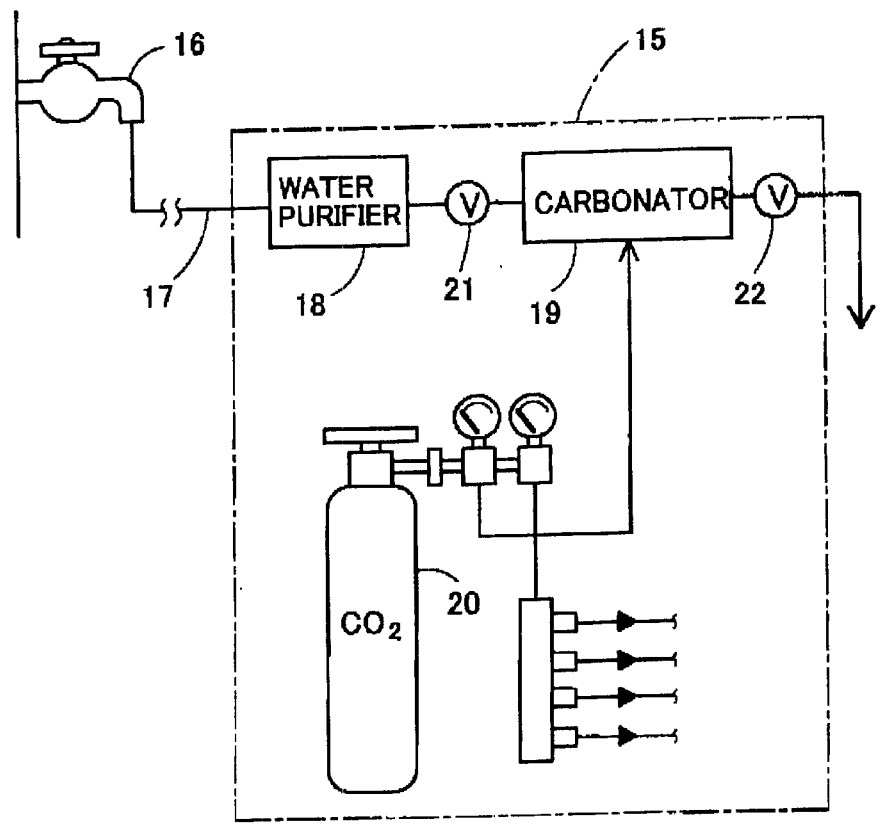
FIG. 2 is a schematic block diagram indicating a conventional carbonated water supply system.

It will be described a carbonated water supply system according to the preferred embodiment of the present invention with reference to FIG. 1. FIG. 1 is a block diagram schematically indicating a carbonated water supply system according to the embodiment.

In FIG. 1, a carbonated water supply system 1, to which water is supplied from a water supply 2 through a water supply conduit 3, comprises a water supply valve 4 controlling water supply by opening or closing thereof, a carbonator 5 producing strong carbonated water by dissolving carbon dioxide gas into water supplied through the water supply valve 4 under a high pressure condition (in this embodiment, the pressure condition is set in a range of 200 kPa to 400 kPa), a carbon dioxide gas bomb 6 supplying high pressure carbon dioxide gas to the carbonator 5, a water purifier 7 having hollow yarn membranes or activated carbon, a conduit 8A connecting an outlet of the carbonator 5 from which high pressure strong carbonated water discharged and an inlet of the water purifier 7 into which high pressure strong carbonated water flows, a pressure releasing valve 9 discharging low pressure carbonated water by lowering pressure in high pressure strong carbonated water purified in the water purifier 7, a conduit 8B connecting an outlet of a water supply valve 10 from which high pressure strong carbonated water purified in the water purifier 7 is discharged and an inlet of the pressure releasing valve 9 into which high pressure strong carbonated water flows and a water supply valve 10 arranged in the conduit 8B between the carbonator 5 and the pressure releasing valve 9, controlling water supply by opening or closing thereof.

In the carbonated water supply system 1 constructed according to the above, water supplied from the water supply 2 to the water supply conduit 3 is supplied to the carbonator 5 through the water supply valve 4. In the carbonator 5, high pressure carbon dioxide gas given from the carbon dioxide gas bomb 6 is dissolved into water under a high pressure condition in a range of 200 kPa to 400 kPa, thereby high pressure strong carbonated water is produced. Such produced high pressure strong carbonated water is supplied to the water purifier 7 through the conduit 8A while retaining its high pressure (200 kPa to 400 kPa).

Thereafter, high pressure strong carbonated water supplied through the conduit 8A passes through hollow yarn membranes or activated carbon in the water purifier 7. While passing through hollow yarn membranes or activated carbon, chlorine or bacteria included in high pressure strong carbonated water is removed because chlorine or bacteria is adhered to hollow yarn membranes or activated carbon. Further, purified high pressure strong carbonated water in the water purifier 7 flows into the pressure releasing valve 9 through the water supply valve 10 and is discharged as low pressure carbonated water out of the system 1 through the pressure releasing valve 9.

In a case that discharge of carbonated water out of the carbonated water supply system 1 is stopped for a long time, both the water supply valve 4 and the water supply valve 10 are closed. Thereby, high pressure strong carbonated water is kept in the carbonator 5, the conduit 8A, the water purifier 7 and the conduit 8B connecting the water purifier 7 and water supply valve 10. After stopping discharge of carbonated water for a long time, when carbonated water is discharged out of the carbonated water supply system 1, both the water supply valve 4 and the water supply valve 10 are opened and supply of carbonated water is immediately started.

As mentioned above in detail, in the carbonated water supply 1 according to the embodiment, water supplied from the water supply 2 to the water supply conduit 3 is supplied to the carbonator 5 through the water supply valve 4. High pressure strong carbonated water produced in the carbonator 5, the carbonated water having a high pressure in a range of 200 kPa to 400 kPa, is supplied to the water purifier 7 through the conduit 8A. In the water purifier 7, high pressure strong carbonated water is purified by hollow yarn membranes or activated carbon while retaining its high pressure (200 kPa to 400 kPa) and is supplied to the pressure releasing valve 9 through the conduit 8A, the water supply valve 10. Thereafter, high pressure strong carbonated water is discharged out of the system 1 as low pressure carbonated water having a pressure substantially equal to the atmospheric pressure.

And when discharge of carbonated water out of the carbonated water supply system 1 is stopped for a long time, both the water supply valve 4 and the water supply valve 10 are closed. After stopping discharge of carbonated water for a long time, both the water supply valve 4 and the water supply valve 10 are opened and supply of carbonated water is immediately started.

Therefore, since carbonated water in the carbonator 5 and the water purifier 7 is retained to a high pressure condition in a range of 200 kPa to 400 kPa, thus carbonated water is retained in a state that highly concentrated carbon dioxide gas is dissolved, breeding of bacteria and the like in the carbonator 5 and the water purifier 7 can be suppressed and the live bacteria value can be retained lower than the water quality standard. In this case, it there will exist bacteria and the like which can breed under such high pressure condition, pressure of carbonated water becomes low pressure substantially equal to the atmospheric pressure. At that time, carbon dioxide gas dissolved in cells of bacteria and the like rapidly expands, thus cells are exploded. As a result, bacteria and the like becomes extinct and carbonated water is disinfected. Therefore, the live bacteria value of carbonated water always becomes lower than the water quality standard, thus carbonated water with good taste and without chlorine smell can be safely produced.

Further, when discharge of carbonated water is stopped for a long time after both the water supply valves 4 and 10 in the carbonated water supply system 1 are closed, the pressure of carbonated water in the water purifier 7 is retained substantially as same as the pressure of carbonated water in the carbonator 5, thereby it can prevent bacteria and the like adhered to hollow yarn membranes or activated carbon from breeding. Therefore, when the water supply valves 4, 10 are opened again, the live bacteria value of carbonated water discharged from the water purifier 7 through the water supply valve 10, the pressure releasing valve 9 can be certainly lowered than the water quality standard, as a result, it is unnecessary to cast away a certain quantity of carbonated water and product cost of carbonated water can be efficiently reduced by decreasing consumption of water.

The foregoing description of the preferred embodiment of the invention has been presented for purposes of illustration and description. It is not intended to be exhaustive or to limit the invention to the precise form disclosed, and modification and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A carbonated water supply system, comprising:
    a carbonator producing carbonated water having a predetermined pressure from water supplied through a first water supply conduit;
    a water purifier to which carbonated water with the predetermined pressure is supplied from the carbonator, the water purifier purifying carbonated water while retaining the predetermined pressure;
    a pressure releasing valve lowering a pressure of carbonated water supplied from the water purifier through a second water supply conduit while releasing the predetermined pressure to a pressure lower than the predetermined pressure;
    a first water supply valve arranged downstream the water purifier in the second water supply conduit, the first water supply valve controlling supply quantity of carbonated water to the releasing valve; and
    a second water supply valve arranged upstream the carbonator in the first water supply conduit, the second water supply valve controlling supply quantity of water to the carbonator, wherein the first and the second water supply valves are closed to maintain the predetermined pressure in both the carbonator and the water purifier when discharge of carbonated water is stopped and are opened when supply of carbonated water is started.

2. The carbonated water supply system according to claim 1, wherein the predetermined pressure lies in a range of 200,000 Pa to 400,000 Pa.

3. The carbonated water supply system according to claim 1, wherein the pressure releasing valve lowers the pressure of carbonated water approximately to the atmospheric pressure.

* * * * *